United States Patent
Todd et al.

(10) Patent No.: US 8,819,203 B1
(45) Date of Patent: *Aug. 26, 2014

(54) TECHNIQUES FOR PROVIDING AN APPLICATION SERVICE TO AN APPLICATION FROM AN APPLIANCE-STYLE APPLICATION SERVICES PLATFORM

(75) Inventors: Stephen J. Todd, Shrewsbury, MA (US); Andreas L. Bauer, Boxborough, MA (US); Gerald E. Cotter, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 879 days.

This patent is subject to a terminal disclaimer.

(21) Appl. No.: 11/864,026

(22) Filed: Sep. 28, 2007

(51) Int. Cl.
*G06F 15/173* (2006.01)

(52) U.S. Cl.
USPC ........... 709/223; 709/216; 709/217; 709/224; 709/226; 711/147; 719/320

(58) Field of Classification Search
CPC ..... H04L 41/0213; H04L 41/06; H04L 29/06; H04L 29/0809; G06F 12/0813; G06F 3/067; G06F 9/5016; G06F 9/45512; G06F 9/4443; G06F 9/465
USPC ......... 709/223–226, 229, 213, 214, 215, 216, 709/217, 227; 719/320; 711/110, 147
See application file for complete search history.

(56) References Cited

U.S. PATENT DOCUMENTS

| | | | | |
|---|---|---|---|---|
| 5,642,505 A * | 6/1997 | Fushimi | ........................ | 707/204 |
| 6,636,961 B1 * | 10/2003 | Braun et al. | ........................ | 713/1 |
| 6,832,236 B1 * | 12/2004 | Hamilton et al. | ............. | 718/100 |
| 6,832,248 B1 * | 12/2004 | Byrnes | ........................ | 709/223 |
| 7,028,079 B2 | 4/2006 | Mastrianni et al. | | |
| 7,127,480 B2 | 10/2006 | Kline et al. | | |
| 7,246,105 B2 * | 7/2007 | Numanoi et al. | ..................... | 1/1 |
| 7,434,011 B2 * | 10/2008 | Shue | ............................. | 711/156 |
| 7,865,765 B2 * | 1/2011 | Trevathan et al. | .................... | 1/1 |
| 7,941,625 B2 * | 5/2011 | Sakaguchi et al. | ............. | 711/165 |
| 8,019,845 B2 * | 9/2011 | Childress et al. | ............. | 709/223 |
| 8,122,110 B1 * | 2/2012 | Wilbur et al. | ................. | 709/221 |
| 8,209,417 B2 * | 6/2012 | Kakarla et al. | ............... | 709/226 |
| 8,352,634 B2 * | 1/2013 | Shen et al. | .................... | 709/238 |
| 2002/0129126 A1 * | 9/2002 | Chu et al. | ...................... | 709/220 |
| 2002/0178233 A1 * | 11/2002 | Mastrianni et al. | .......... | 709/217 |
| 2004/0044707 A1 * | 3/2004 | Richard | ....................... | 707/204 |
| 2004/0111652 A1 * | 6/2004 | Shoaib et al. | .................... | 714/15 |
| 2005/0289388 A1 * | 12/2005 | Black-Ziegelbein et al. | ..... | 714/7 |
| 2006/0010176 A1 * | 1/2006 | Armington | ................... | 707/204 |
| 2006/0090058 A1 * | 4/2006 | Chng et al. | .................... | 711/173 |
| 2006/0282519 A1 * | 12/2006 | Trevathan et al. | ............ | 709/223 |
| 2007/0019626 A1 * | 1/2007 | Lahiri et al. | .................. | 370/352 |
| 2007/0043923 A1 * | 2/2007 | Shue | ............................. | 711/170 |
| 2008/0082777 A1 * | 4/2008 | Sakaguchi et al. | ............ | 711/170 |

* cited by examiner

*Primary Examiner* — Jimmy H Tran
(74) *Attorney, Agent, or Firm* — BainwoodHuang

(57) ABSTRACT

An application services platform includes a platform chassis, a network interface supported by the platform chassis, and a control circuit supported by the platform chassis and coupled to the network interface. The control circuit is arranged to connect to a network through the network interface, and receive an application service command from a user. The application service command gives the control circuit permission to provide an application service to an application running on a server on the network. The control circuit is further arranged to provide the application service to the application running on the server on the network in response to receipt of the application service command. The application services platform is capable of being provided in the form of an appliance-style device which is simply added as a new device on the network.

8 Claims, 8 Drawing Sheets

TECHNIQUES FOR PROVIDING AN APPLICATION SERVICE TO AN APPLICATION FROM AN APPLIANCE-STYLE APPLICATION SERVICES PLATFORM

BACKGROUND

In general, a server is a computer that services requests from one or more client computers linked by a network. For instance, a SQL server is a specialized computer that provides database access in response to SQL-coded client requests. Similarly, a web server is a specialized computer that provides web pages in response to web page requests.

The principal component to such a server is its specialized server application. Such an application typically includes a complex set of programs, configuration information, and data files, among other things. Additionally, such an application typically imposes a stringent set of minimal computer requirements to operate properly. Microsoft SQL Server® offered by Microsoft Corporation of Redmond, Wash. is an example of a SQL application. Apache HTTP Server offered by the Apache Software Foundation of Forest Hill, Md. is an example of a web server application. Microsoft Exchange Server® offered by Microsoft Corporation is an example of a messaging and collaborative software application.

The underlying hardware and operating system provide resources (e.g., compute time, memory, bandwidth, data storage, etc.) that enable the server application to achieve its various functions. For certain security protection services that the server application or operating system is otherwise incapable of otherwise obtaining (e.g., specialized anti-virus protection, firewall protection, and spam filtering), an independent application can be added to the server to provide those services.

In addition to the operating system services and the security protection services that an application can receive while running on a server, the application may require additional resources over time. For example, there may be a need to increase the application's throughput or storage capacity as demands on the application and the server grow. At some point, it may no longer be practical or even possible to (i) increase the server's compute power by simply upgrading or adding processors on the server, or (ii) increase the server's storage capacity by simply adding more disk drives or replacing existing disk drives with higher capacity disk drives.

Once upgrading the individual components of the server is no longer possible or practical, the typical approach to increasing the capabilities of the application (e.g., the application's throughput and storage capacity) is to replace the original server with a new more powerful server that has more computer power and memory capacity. To this end, a technician often makes a copy of the application's data and manually stores that copy on the new more powerful server. The technician further shuts down the original server and runs a new version of the application on the new more powerful server.

SUMMARY

Unfortunately, there are drawbacks to the above-described approach to increasing the capabilities of the application running on the server. For example, the manual transition from the original server to the new more powerful server typically requires the involvement (time, an eye for detail, etc.) of trained and experienced technicians. Often, such a technician may be skilled and well-versed on managing operation of a particular server application, but lack important training to manage other server applications running on the same or adjacent computer systems.

Furthermore, even when such talent is readily available, migration of the application and its data to new more powerful server often becomes difficult as additional hardware comes into play and key information changes location. Often, the risk of human error is legitimate due to the complexity of the application. As such, it is quite possible that manually carrying out migration of the application and its data from the original server to the new more powerful server may result in a loss of some information or functionality requiring additional unbudgeted time, effort and expense.

In contrast to the above-described deficiencies to manually migrating an application from an original server to a new more powerful server, an improved technique of providing an application service to an application involves utilization of an application services platform (e.g., an appliance-style device which is added to enhance operation of the application). Such an application services platform is able to provide application services to one or more applications without significantly burdening the original server or servers running the applications since the application services platform can be provisioned with its own processing circuitry and storage. Moreover, the application services platform is capable of being pre-configured for automatic discovery and user-friendly application migration so that eventual application migration to the application services platform can take place more transparently while the original server or servers are still running.

One embodiment is directed to an application services platform which includes a platform chassis, a network interface supported by the platform chassis, and a control circuit supported by the platform chassis and coupled to the network interface. The control circuit is arranged to connect to a network through the network interface, and receive an application service command from a user. The application service command gives the control circuit permission to provide an application service to an application running on a server on the network. The control circuit is further arranged to provide the application service to the application running on the server on the network in response to receipt of the application service command. The application services platform is capable of being provided in the form of an appliance-style device which is simply added as a new device on the network.

BRIEF DESCRIPTION OF THE DRAWINGS

The foregoing and other objects, features and advantages will be apparent from the following description of particular embodiments of the invention in conjunction with the accompanying drawings in which like numerals indicate like structural elements and features in the various figures. The drawings are not necessarily to scale, emphasis instead being placed upon illustrating the principles of various embodiments of the invention.

DETAILED DESCRIPTION

Improved techniques of providing an application service to an application involve utilization of an application services platform (e.g., an appliance-style device which is added to enhance operation of the application). Such an application services platform is able to provide application services to multiple applications without significantly burdening the original server or servers running the applications since the application services platform can be provisioned with its own processing circuitry and storage.

Moreover, the application services platform is capable of being pre-configured for automatic discovery and user-friendly application migration so that eventual application migration can take place more transparently while the original server or servers are still running.

Figure 1:
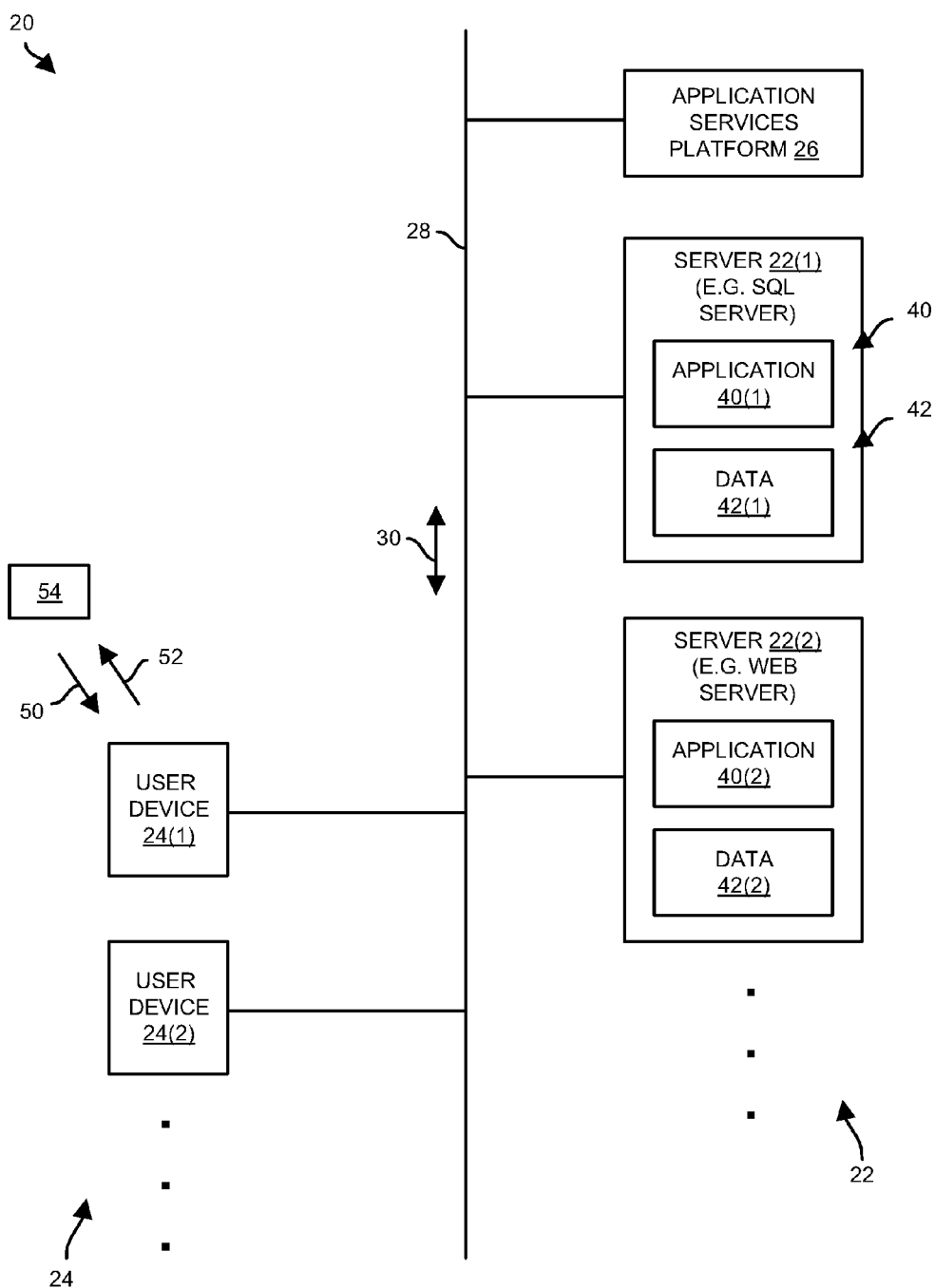
FIG. 1 is a block diagram of an electronic system having a distinct application services platform from which to carry out application support tasks.

FIG. 1 shows an electronic system 20 which utilizes a distinct application services platform from which provides application services to applications running on servers. The electronic system 20 includes a set of servers 22(1), 22(2), ... (collectively, servers 22), a set of user devices 24(1), 24(2), ... (collectively, user devices 24), an application services platform 26, and a communications fabric 28 (e.g., a computer network). The communications fabric 28 conveys signals 30 among the various computerized devices 22, 24, 26 of the system 20.

It should be understood that the communications fabric 28 is illustrated as having a backbone topology by way of example only. The communications fabric 28 may include a variety of media (e.g., copper wire, fiber optic cable, wireless medium, related data communications devices, combinations thereof, etc.) and other devices (e.g., network nodes, firewalls, routers, switches, bridges, gateways, etc.). Additionally, the communications fabric may have other topologies (e.g., hub and spoke, point-to-point, loops, irregular, combinations thereof, and so on).

Each server 22 includes a server application 40 (i.e., software running on one or more processors) and server data 42 (i.e., configuration information, transactional data, records, files, etc.). In particular, the server 22(1) includes a server application 40(1) and server data 42(1). Similarly, the server 22(2) includes a server application 40(2) and server data 42(2), and so on. It should be understood that each server 22 is further capable of having multiple server applications 40 and corresponding server data 42.

Each user device 24 is a client-style device such as a laptop, a computer workstation, a smart phone or appliance, and so on. The user devices 24 are arranged to obtain services from the servers 22. By way of example, the server 22(1) is a SQL server which provides access to a set of databases, and the server 22(2) is a web server which provides access to a set of websites.

During operation, the application services platform 26 is configured to receive input 50 from and provide output 52 to a user 54 (also see the signals 30 through the communications fabric 28). The input 50 is preferably in the form of a set of commands, data, and configuration information obtained through input equipment, e.g., a keyboard and a mouse. The output 52 is preferably in the form of text and graphical information presented to the user through a display (e.g., a web page on a web browser, a graphical user interface, etc.). To this end at least one of the user devices 24 (e.g., the user device 24(1)) is capable of operating as an input/output (I/O) device which enables the user 54 to control and operate the application services platform 26 in an interactive manner. Alternatively, the user can use a dedicated console (e.g., an I/O terminal directly connected to the application services platform 26) to provide the input 50 to and receive the output 52 from the application services platform 26.

In response to such user interaction, the application services platform 26 is arranged to carry out a variety of application support tasks such as application discovery, provisioning, and monitoring. Such operation, which will be discussed in further detail shortly, allows the underlying platforms of the servers 22 (e.g., the hardware and operating systems) to continue to reliably run their server software without being significantly taxed by having to directly perform the application support tasks as well. For example, suppose that the server 22(1) is nearing its throughput and storage limitations. Rather than burden the server 22(1) with having to run additional software to carryout the application support tasks which may be otherwise impossible due to the server's limitation, the applications support tasks can be freely carried out by the application services platform 26 in an unconstrained manner. Further details will now be provided with reference to FIG. 2.

Figure 2:
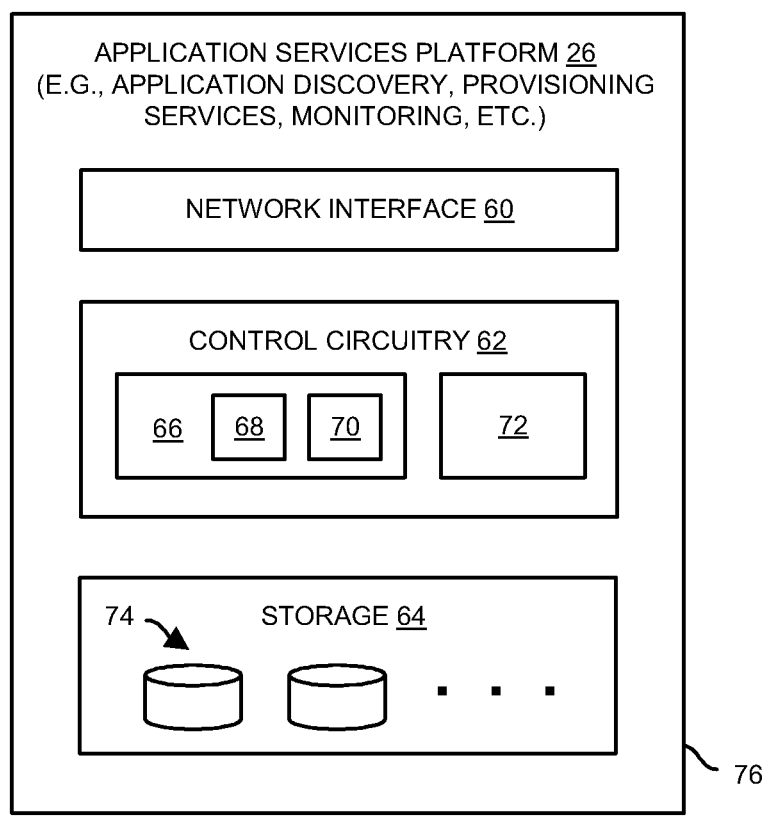
FIG. 2 is a block diagram of the application services platform of FIG. 1.

FIG. 2 shows particular details of the application services platform 26. As shown, the application services platform 26 includes a network interface 60, control circuitry 62 and storage 64. The network interface 60 is arranged to provide the application services platform 26 with connectivity to the communications fabric 28 of the electronic system 20 (e.g., access to a computer network). The control circuitry 62 includes (i) memory 66 which stores a specialized application 68 and other information 70 (e.g., application profile information) and (ii) a set of processors 72 which runs the application 68 in order to perform the application support tasks. The storage 64 includes a set of storage devices 74 (e.g., disk drives, flash memory drives, cache memory, etc.) to provide additional storage capacity which is available to the applications 40 running on the servers 22.

In some arrangements, the application services platform 26 is an enhanced storage array which conveniently provides high-throughput (e.g., reliable write caching), load balancing (multiple storage processors), fault tolerance (component redundancy), and data recovery (RAID with hot standby devices). In some arrangements, the memory 66 and the storage 64 reside together physically but are allocated to the control circuitry 62 and the storage 64 in a predefined manner, e.g., using address partitions.

At this point, it should be understood that the application services platform 26 is equipped with both computer throughput power and storage capacity, and is capable of sharing this processing power and storage capacity with one or more of the servers 22 to improve operation of the electronic system 20 as a whole. Accordingly, the application services platform 26 enjoys the ability to provide application services beyond the limited conventional operating system services and security protection services offered by the individual servers 22 to their respective applications 40.

In some arrangements, the application services platform 26 has its own platform chassis 76 which supports at least some of the other components 60, 62, 64. Such a chassis 76 is capable of taking a variety of forms such as a rack mount enclosure, a standalone housing or cabinet, and so on. In these arrangements, the user 54 perceives the application services platform 26 as an appliance-style device which the user 54 simply adds onto the electronic system 20 to enhance application operation. That is, the user 54 can essentially take the application services platform 26 out of the box, connect it to the network (see the communications fabric 28 in FIG. 1), and provision and support needy applications 40 of the system 20. Such provisioning (e.g., adding storage capacity) and application servicing (e.g., protecting data) can be carried out by the user 54 using a browser running on one of the user devices 24 (FIG. 1). Particular operational details of the application services platform 26 will now be provided with reference to FIG. 3.

Figure 3:
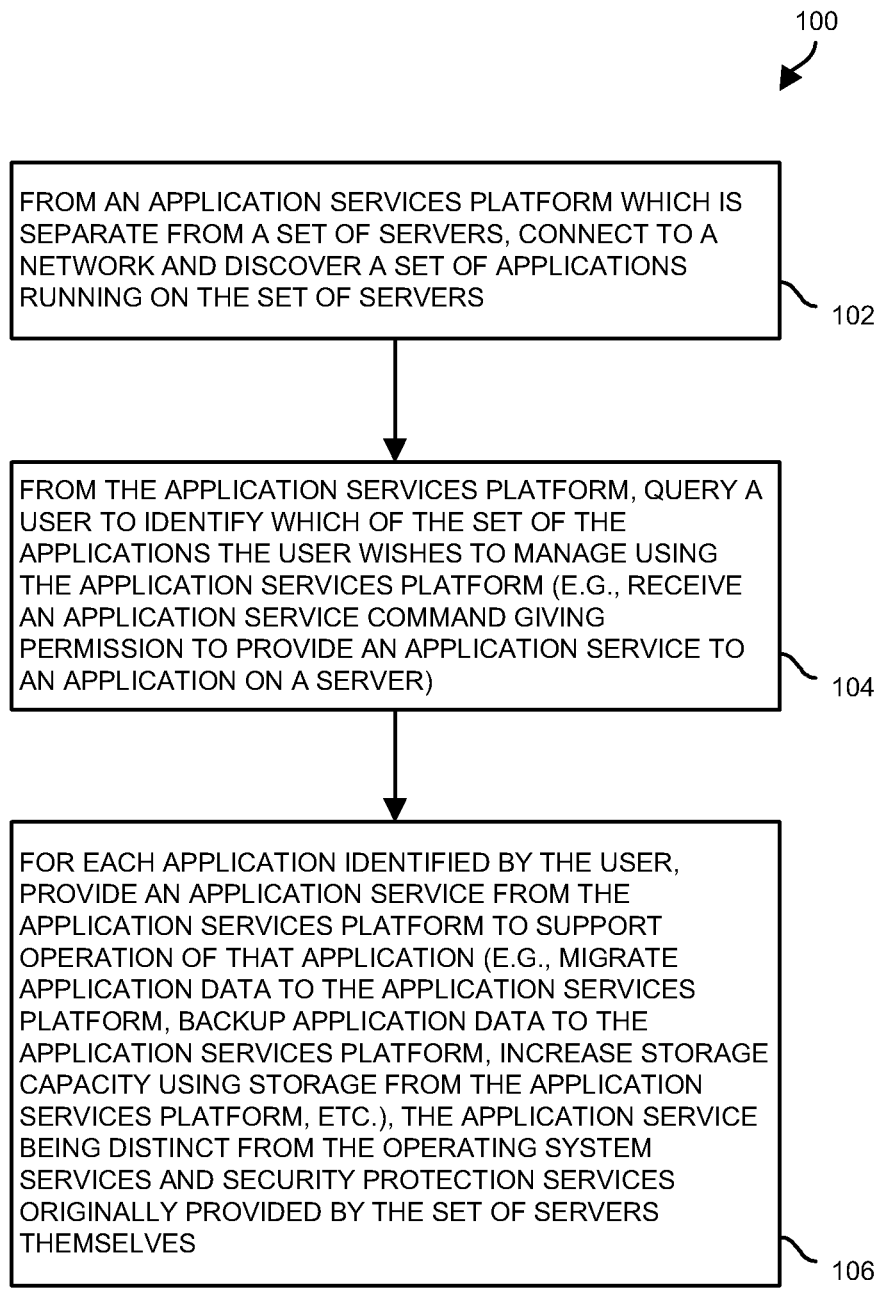
FIG. 3 is a flowchart illustrating a procedure carried out by the application services platform of FIG. 2.

FIG. 3 shows a procedure 100 which is performed by the control circuitry 62 of the application services platform 26. In step 102, the control circuitry 62 connects to a computer network (e.g., the communications fabric 28, see FIG. 1) and discovers a set of applications 40 running on the set of servers 22. In some arrangements, such discovery is automatically triggered upon powering up and connecting the application services platform 26 to the communications fabric 28. Such discovery is capable of being carried out transparently by monitoring communications (e.g., see the exchanged signals 30 in FIG. 1) on the communications fabric 28 without hindering routine operation of the servers 22 on the electronic system 20. A similar technique is described in U.S. application Ser. No. 11/906,160 entitled "TECHNIQUES FOR AUTOMATED APPLICATION DISCOVERY", the teachings of which are hereby incorporated by reference in their entirety.

In step 104, the control circuitry 62 queries the user to identify which of the set of applications 40 the user wishes to manage. In particular, the control circuitry 62 receives one or more application service commands from the user. Each application service command gives the control circuitry 62 permission to provide a particular application service to a particular application 40 running on a server 22.

It should be understood that, in step 104, the user does not need to immediately manage all of the applications 40 using the application services platform 26. Rather, the user is capable of selecting applications 40 to manage and thus incrementally enhancing the operation of the electronic system 20 on an application-by-application basis. Along these lines, the user simply re-enters the procedure 100 to select a new application 40 that the user did not select during a previous iteration.

In step 106, for each application 40 identified by the user, the application services platform 26 provides an application service to that application 40 to support operation of that application 40. That is, the control circuitry 62 provides an application service to an application in response to each application service command. Such application services can be of a form that is beyond the operating system services and security protection services provided by the set of servers 22. For example, the application services platform 26 is capable of migrating either the application 40, the application data 42 or both to the application services platform 26. As another example, the application services platform 26 is capable of backing up either the application 40, the application data 42 or both to the application services platform 26. As yet another example, the application services platform 26 is capable of augmenting the storage capacity for the application data 42 using the storage 64 of the application services platform 26. Further details will now be provided with reference to FIGS. 4 and 5.

Figure 4:
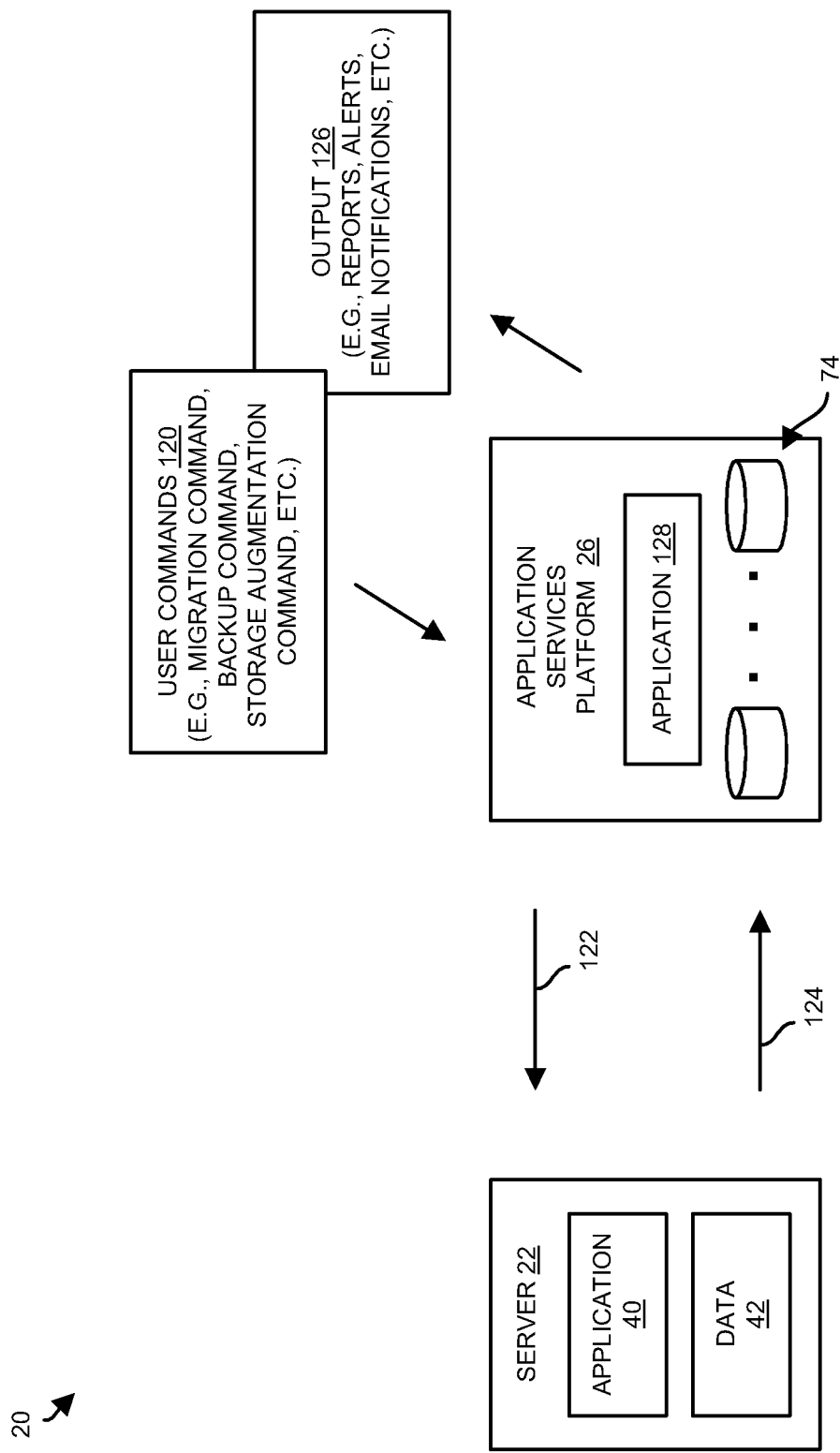
FIG. 4 is a block diagram illustrating certain application support services provided by the application services platform of FIG. 2.
Figure 5:
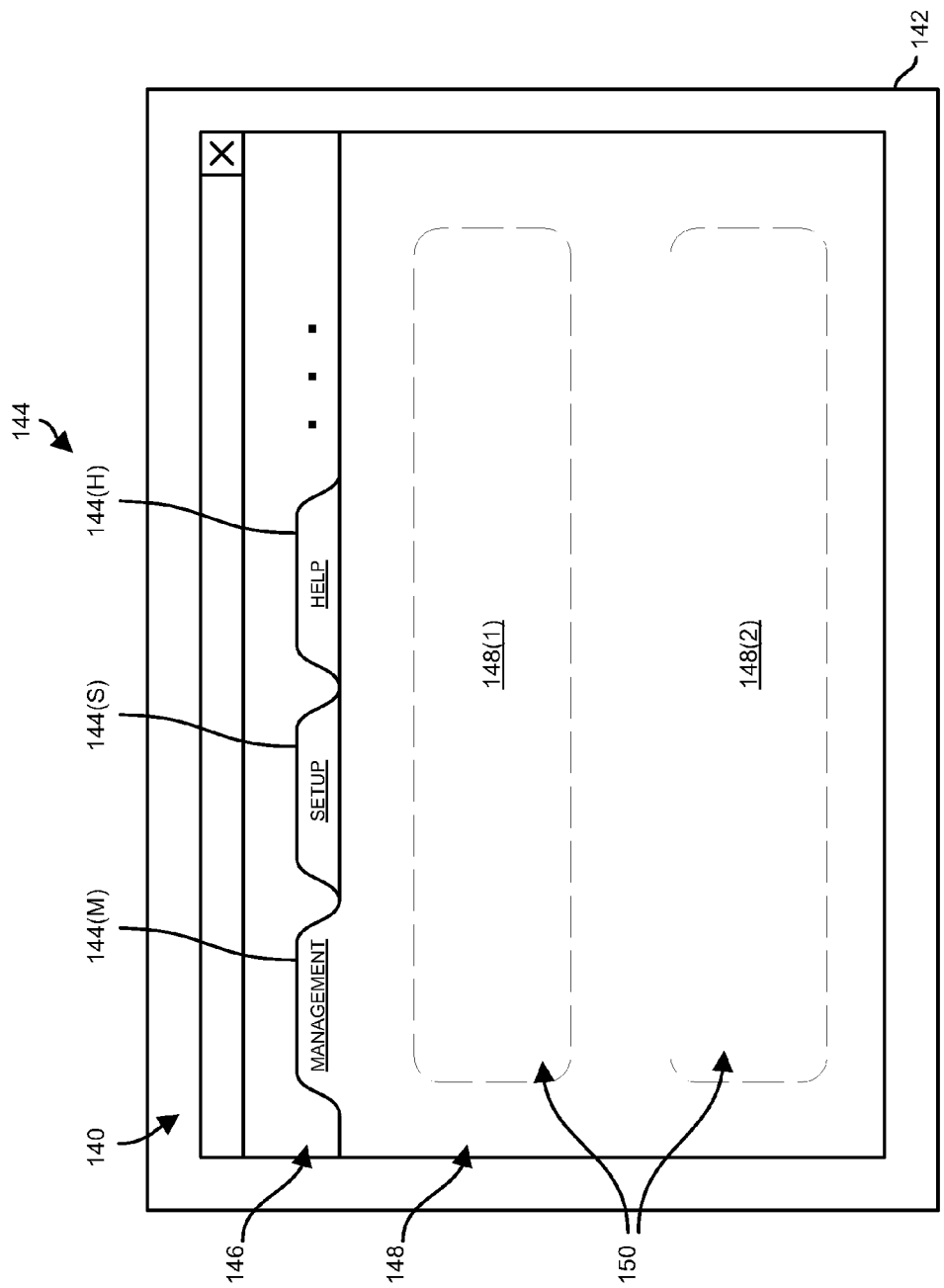
FIG. 5 is a block diagram of a web page layout which is suitable for use by the application services platform of FIG. 2.

FIGS. 4 and 5 illustrate particular aspects of user interaction with the application services platform 26. FIG. 4 illustrates how the application services platform 26 provides certain application support services to a server 22 in response to commands 120 from the user. FIG. 5 shows an example a screen layout 140 which the application services platform 26 provides to the user on a display 142, e.g., a screen of one of the user devices 24.

The user provides commands 120 (FIG. 4) to the application services platform 26 (also see step 104 in FIG. 3) by interacting with the display 142 (FIG. 5). Information on the display 142 facilitates the user's ability to effectively provide the commands 120. In particular, as illustrated in FIG. 5, the screen layout 140 provides windows 144 which give the user the ability to navigate among different features of the application services platform 26, e.g., using tabs 146 which the user can select by operating a mouse or cursor. Each window 144 provides the user with the ability to carry out certain operations. For example, a management window 144(M) enables the user to carry out certain application servicing and monitoring operations. As another example, a setup window 144(S) enables the user to carry out certain setup/configuration tasks. Additionally, a help window 144(H) provides the user with help, instructions, recommendations, etc. to aid the user. Other layouts, arrangements, tabs, etc. are suitable for use as well.

In the layout 140, each window 144 includes a set of panes 148 which enables the user to effectively interact with the application services platform 26. For example, as shown in FIG. 5, the management window 144(M) provides a discovery pane 148(1) listing applications 40 which the application services platform 26 has discovered running on the electronic system 20. The management window 144(M) further provides a task pane 148(2) which enables the user to select (e.g., in a simplified manner) particular types of application support tasks that the application services platform 26 is capable of providing to the discovered applications 40. Each pane 148 is capable of including various links or similar interfacing mechanisms 150 (shown generally by the arrow 150 in FIG. 5) that facilitate user navigation to other sources of user information.

Such a layout 140 results in a simple interface through which the user controls the application services platform 26. For example, for each discovered application 40, the user provides (i) a move command indicating whether the user wishes to move data 42 of that application 40 to new hardware of the application support platform 26, (ii) a backup command indicating whether the user wishes to backup the application data 42 on the new hardware, and (iii) a storage augmentation command indicating whether the user wishes to provide additional storage capacity for the application data 42 from the new hardware.

In response to such commands 120 or similar commands 120, the application services platform sends signals 122 to the server 22 on which the application 40 is running and receives signals 124 from the server 22, as well as provides output 126 back to the user. In this manner, the application services platform 26 coordinates its activities to carry out certain application service tasks thus enhancing the operation of the discovered application 40 and the electronic system 20 as a whole.

In some situations, the application services platform 26 is capable of communicating with the server 22 to migrate the discovered application 40 itself to the application services platform 26. To this end, the application services platform 26 installs and runs an application image 128 (FIG. 4) which is similar to the application 40 running on the server 22. As a result, the application services platform 26 is now able to contribute throughput and storage capacity, or eventually even take over entirely for the server 22 if the user decides that the application services platform 26 is better suited to run the application 40 in place of the server 22 going forward (e.g., the application services platform 26 may have faster hardware and more storage capacity than the original server 22).

At this point, it should be understood that the application services platform 26 is capable of performing a variety of specialized application management tasks. Below are a few examples of such tasks.

Report Generation

To direct the application services platform 26 to provide a report regarding a particular application 40 running on the electronic system 20, the user provides a report generation signal to the application services platform 26 (see the command 120 in FIG. 4). In response to the report generation signal, the application services platform 26 generates a report for the particular application 40 (see the output 126 in FIG. 4). The report provides configuration and performance information outlining how the particular application 40 is configured and performs when operating on the electronic system 20.

This report is capable of being viewed through the display 142, or exported for use in an analysis tool. Moreover, the report is capable of providing valuable information that may be needed by a server administrator during certain critical tasks such as migrating the application 40 itself from a server 22 to the application services platform 26 to take advantage of certain application services that the servers 22 may not be able to provide themselves (e.g., higher throughput, fault tolerance via a particular RAID level, data recovery, etc.).

Application Monitoring

To direct the application services platform 26 to monitor a particular application 40 running on the electronic system 20, the user provides a monitor signal to the application services platform 26 (see the command 120 in FIG. 4). In response, the application services platform 26 monitors operation and collects data (see the signals 122, 124 in FIG. 4).

Along these lines, the application services platform 26 can be configured to automatically send an email message to an email account of the user if it determines that a particular application 40 has failed (see the output 126 in FIG. 4). For example, if the application services platform 26 has not seen activity from a particular application 40 for a predetermined amount of time (e.g., a heartbeat) and/or the application services platform 26 has not received a response from the application 40 after a timeout period has elapsed, the application services platform 26 is capable of providing an alert email or notification to the user.

Within the alert email, the application services platform 26 preferably includes a web page link (similar to the links 150 in FIG. 5) which enables the user to navigate to appropriate web pages and immediately attend to the particular application 40 that has failed. In particular, the user clicks on the link which automatically launches a window 144 to the application services platform 26 to enable the user to access appropriate application servicing tasks.

For example, in response to a web page request generated by clicking on the link, the application services platform 26 provides an application management web page which details (i) fault information relating to the particular application 40 that has failed, and (ii) steps which have automatically been taken to preserve data of the particular application 40 (see the windows 144 in FIG. 5). Such a page is capable of informing the user that a particular disk drive has failed and that data of the particular application that resided on the particular disk drive has been recovered automatically to a hot spare disk drive (e.g., see the storage devices 72 in FIG. 4). Additionally or alternatively, such a page is capable of outputting a list of instructions arranged to instruct the user how to fix the particular application 40 that has failed (e.g., see the help window 144(H) in FIG. 5).

Additional Control

The application services platform 26 is capable of providing other application services as well. For example, the user is capable of providing a quality of service parameter to the application services platform 26 (see the command 120 in FIG. 4). The quality of service parameter defines a level of performance by a particular application 40. In response to the quality of service parameter, the application services platform 26 adjusts operation of the particular application 40 within the electronic system 20 to provide the level of performance by the particular application 40.

It should be understood that, when the application continues to run on a server 40, the application services platform 26 is able to improve certain aspects of quality of service such as response times for certain transactions if the application services platform 26 provides high speed caching for the application 40 (e.g., write back caching into semiconductor memory). Furthermore, when the application runs on the application services platform 26 itself opportunities for additional quality of service improvements exists such as prioritization/classification of requests, load balancing, and so on.

As another example, the application services platform 26 is capable of receiving a Redundant Array of Inexpensive Disks (RAID) parameter from the user for a particular application 40 (see the command 120 in FIG. 5). The RAID parameter defines a particular RAID level for storing data of the particular application 40 (e.g., RAID 0, RAID 5 and so on). In response to the RAID parameter the application services platform 26 stores the data of the particular application 40 in compliance with the RAID level parameter.

Figure 6:
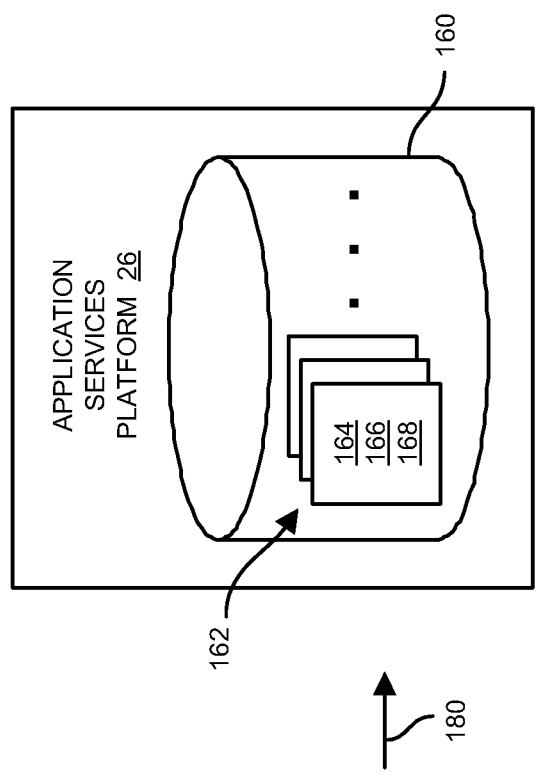
FIG. 6 is a block diagram of a supported-applications database of the application services platform of FIG. 2.
Figure 6:
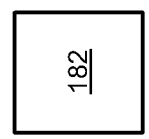

Further details will now be provided with reference to FIG. 6.

FIG. 6 shows a supported-applications database 160 which is maintained by the control circuitry 62 of the application services platform 26 (also see the other information 70 in FIG. 2). The supported-applications database 160 includes individual entries 162 corresponding to the applications 40 which the application services platform 26 is able to support. In particular, each entry 162 of the database 160 includes certain application specific information that enables the application services platform 26 to discover, provision and manage a particular application 40. Such information includes application pre-loaded application information 164, application information 166 that the application services platform 26 has accumulated over time by monitoring the communications fabric 28, and user-entered information 168 that has been added by the user.

In connection with the pre-loaded application information 164, such information 164 may include profile information which enables the application services platform 26 to properly communicate with the application 40 (e.g., validation, authentication, licensing, and security handshaking), specialized routines which enable the application services platform 26 to directly provision and manage certain operations of the application 40 (e.g., migration, backups, storage augmentation, application monitoring, fault handing, etc.), and management and support tools (e.g., recommended hardware requirements, recommended runtime provisions, tools for performance analysis, etc.).

It should be understood that the application services platform 26 is capable of receiving an external update request signal 180, and automatically updating the supported-applications database 160 with application information 182 (e.g., a new set of recommended provisions) in response to the external update request signal 180. Such a signal 180 may be automatically received in the form of periodic online updates, or obtained upon request by the user, or by other means (e.g., loading a CD-ROM, downloading from the network, etc.). Along these lines, application vendors may even offer the pre-loaded application information 164, 180 via an established value added reseller (VAR) agreement/relationship with the manufacturer/supplier of the application services platform 26. Such information 164, 180 is capable of being entered into the database 160 at the time of initial integration, at a subsequent time or both.

In connection with the run-time accumulated application information 166, such information 166 may include specific configuration details that the application services platform 26 has detected over time. Such information 166 may include specific configuration information (e.g., device network addresses, usernames, particular protocols in use, etc.), performance statistics (e.g., measured throughput/traffic, response times, frequencies of use, etc.), and recommendations generated by the application services platform 26 to improve performance and efficiency.

In connection with the user-entered application information 168, such information 168 may include commands and data that the user has entered during operation of the application services platform 26. Such information 166 may include the current configuration for the application 40 (e.g., where the application 40 resides, how the application 40 is configured to run, where the application data 42 resides, authorized users, passwords, allocated storage capacities, etc.), commands directing how the application services platform 26 should operate under certain situations (e.g., to guarantee a particular quality of service, to implement a certain RAID level, to carry out backups, to detect/correct certain types of faults, etc.).

In all, the various entries 162 containing the information 164, 166, 168 within the supported-applications database 160 are accessible by the user via the earlier-described user interaction (also see FIGS. 4 and 5). For example, the user is capable of obtaining, from the database 160, a set of recommended provisions or following a set of fault recovery instructions for a particular application 40 by accessing the database information through one of the user devices 24. Such user management of the applications 40 does not penalize the servers 22 since management occurs from the application services platform 26 without taxing the servers 22. Further details will now be provided with reference to FIG. 7.

Figure 7:
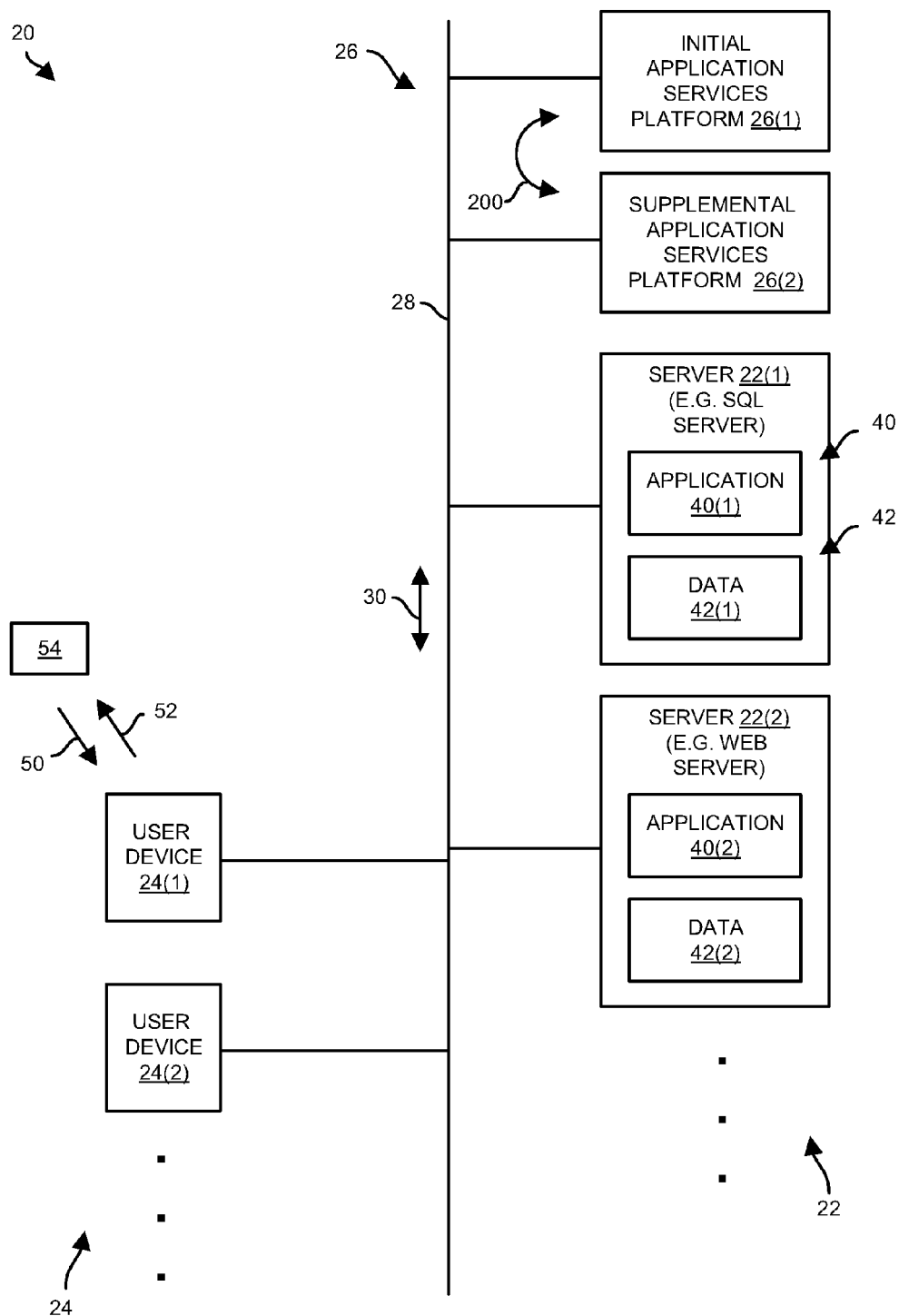
FIG. 7 is a block diagram of the electronic system of FIG. 1 with multiple application services platforms.

FIG. 7 shows the electronic system 20 with multiple application services platforms 26. Here, after the electronic system 20 has operated for a period of time with an initial application services platform 26(1), the user adds a second application services platform 26(2). Perhaps the initial application services platform 26(1) has increased the number of managed applications 40 over time and the additional hardware 26(2) has been added in a supplemental manner to maintain robust and reliable integrated, unified control over the many applications 40.

In some arrangements, the application services platforms 26 are arranged to carry out an auto-discovery procedure by exchanging signals 200. In particular, the second application services platform 26(2) transmits a new hardware signal onto the communications fabric 28. The new hardware signal indicates that additional new hardware has been added to the electronic system 20. The initial application services platform 26(1) receives the new hardware signal and responds by automatically re-running at least a portion of the procedure 100 (also see FIG. 3). That is, the application services platform 26(1) which may now be the primary or master of multiple application services platforms 26, re-lists the set of applications 40 that it knows about on the electronic system 20, and queries the user for new instructions (e.g., new user commands 120).

Accordingly, the user is able to direct the application services platforms 26 to carryout various application service tasks such as migration, backup and storage capacity augmentation but with the additional hardware in mind. With multiple application services platforms 26 in place, additional flexibility may now be available such as certain types of mirroring, load balancing and fault handling. Further details of how the user operates the electronic system 20 will now be provided with reference to FIG. 8.

Figure 8:
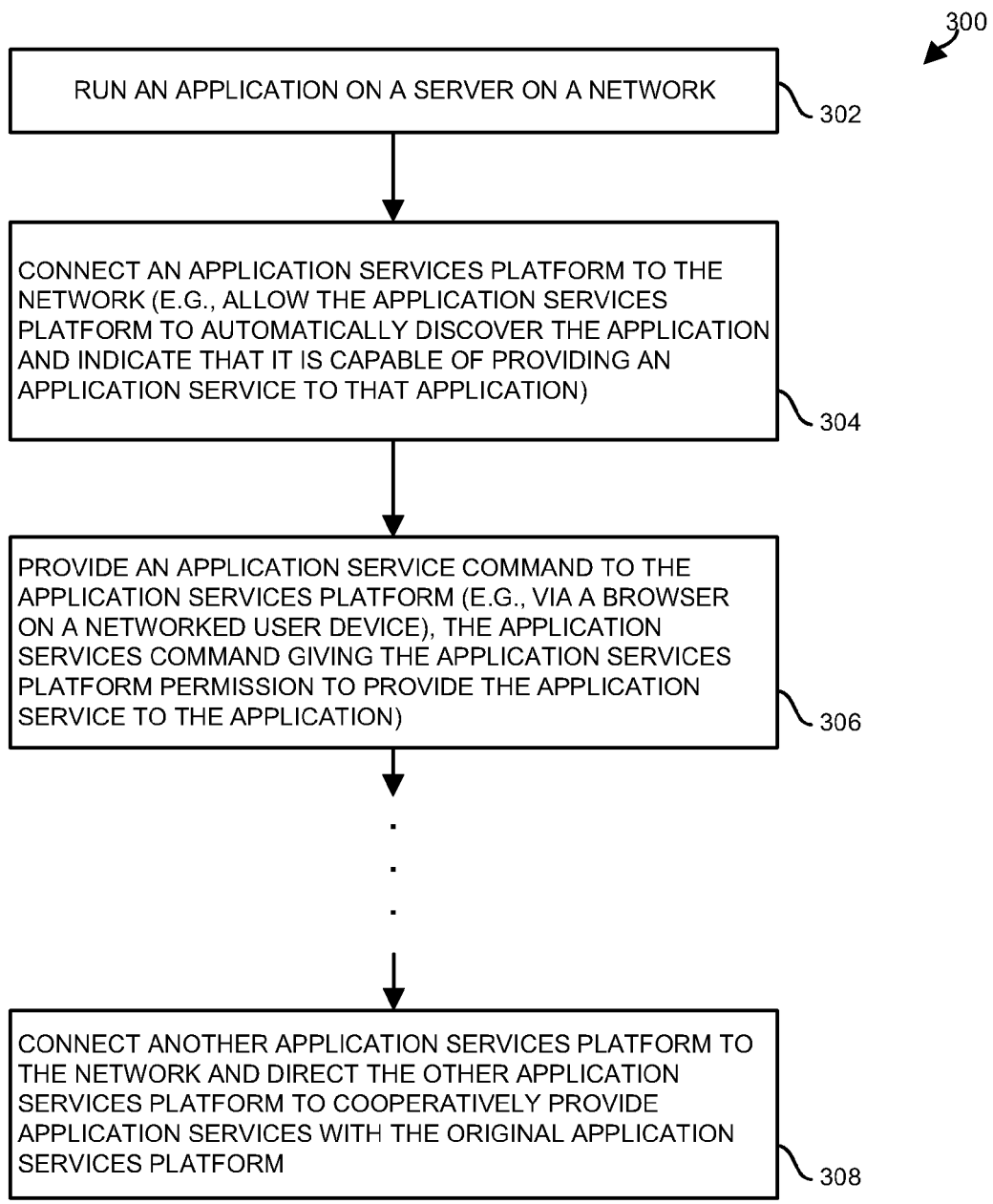
FIG. 8 is a flowchart of procedure which is carried out by a user of the electronic system of FIG. 1.

FIG. 8 is a flowchart of procedure 300 which is carried out by a user 54 of the electronic system 20 when providing an application service to an application 40. In step 302, the user 54 runs the application 40 on a server 22 on the communications fabric 28. The user 54 is able to control such operation via a user device 24 (also see FIG. 1).

At some point, the user 54 may wish to improve the performance of the application 40 running on the server 22. Manually upgrading the server 22 (e.g., replacing the original processing circuitry with faster processing circuitry, adding storage to the server 22, etc.) may no longer be practical or possible. Furthermore, even if manually upgrading the server 22 is available, the user 54 may be reluctant to manually carry out such a modification to the server 22 out of fear that such a manual upgrade will not go smoothly and possibly negatively affect the operation of the application 40 or the server 22.

In step 304, the user 54 connects the application services platform 26 to the communications fabric 28 (FIG. 1) thus greatly simplifying the user's tasks. In response to such connection, the application services platform 26 automatically discovers the application 40 running on the server 22 and indicates to the user 54 (e.g., through a browser running on a user device 24) that the application services platform 26 is capable of providing one or more application services to the application 40 running on the server 22. The user input 50 to the application services platform 26 and output 52 from the application services platform 26 are illustrated in FIG. 1 as arrows between a user device 24 and the user 54. Along these lines, via a screen layout 140 (also see FIG. 5), the application services platform 26 provides a list of application 40 and servers 22 in web page form to the user 54 and allows the user 54 to check off which ones should be (i) moved to the application services platform 26, (ii) backed-up to the application services platform 26, (iii) provided with storage from the application services platform 26, and so on.

In step 306, the user 54 provides a set of application service commands 120 to the application services platform 26 (also see FIG. 4). Each command 120 provides the application services platform with permission to provide a particular application service to a particular application 40 running on a particular server 22. In response to receipt of such commands 120, the application services platform 26 provides the application services. For example, the user 54 is capable of directing the application services platform 26 to augment the current storage capacity for storing the original application data of an application 40 with storage from storage devices 74 (also see FIGS. 2 and 4). As another example, the user 54 is capable of directing the application services platform 26 to backup a copy of the application data of the application 40 onto the storage devices 74. As yet another example, the user 54 is capable of directing the application services platform 26 to migrate the original application data onto the storage devices 74.

The application services platform 26 is capable of providing combinations of application services and other applications services as well. The delivery of such application services to the applications 40 is capable of occurring while the applications 40 and the servers 22 remain up and running.

At this point, the user 54 may perform additional steps such as repeat step 306 for other existing applications 40 or install new applications 40 directly on the application services platform 26. As another example, the user 54 may augment the application services platform 26. In particular, in some arrangements, the application services platform 26 is initially a small but scalable data storage array, and the user 54 is capable of adding additional storage devices 74 to augment the storage 64 (e.g., see FIG. 5).

In step 308, which may occur after a period of operating the electronic system 20 with only one application services platform 26, the user 54 adds another application services platform 26. Here (also see FIG. 7), the first application services platform 26(1) is arranged to automatically discover, through the communications fabric 28, the new application services platform 26(2) and prompt the other application services platform 26(2) for configuration information to assess abilities to cooperatively provide application services (see the signals 200 exchanged between the multiple application services platforms 26 in FIG. 7). Again, through the screen layout 140 (FIG. 5), the first application services platform 26(1) shows the user a list of applications 40 and servers 22 and lets the user 54 check which ones should be handled by both platforms 26 (e.g., moved to the new platform 26(2), replicated to the new platform 26(2), obtain new storage on the new platform 26(2), and so on). With multiple application services platforms 26 now running on the electronic system 20, the application services platforms 26 can offer additional fault tolerance and load balancing among the multiple application services platforms 26.

As described above, improved techniques of providing an application service to an application 40 involve utilization of an application services platform 26 (e.g., an appliance-style device which is added to enhance operation of the application 40). Such an application services platform 26 is able to provide application services to multiple applications 40 without significantly burdening the original server or servers 22 running the applications 40 since the application services platform 26 can be provisioned with its own control circuitry 62 and storage 64. Moreover, the application services platform 26 is capable of being pre-configured for automatic discovery and user-friendly application migration so that eventual application migration can take place more transparently while the original server or servers 22 are still running.

While various embodiments of the invention have been particularly shown and described, it will be understood by those skilled in the art that various changes in form and details may be made therein without departing from the spirit and scope of the invention as defined by the appended claims.

For example, the applications 40 described above included a SQL application and a web application by way of example only. Other types of applications are suitable for use as well such as other database server applications, other web applications, email server applications, file server applications, security server applications, network server applications, specialized applications, and so on.

Additionally, it should be understood that the procedure 300 was described above as starting with applications 40 initially running on separate servers 22 which are in need of extra provisioning and services. It should be further understood that new applications 40 can be directly installed onto the application services platform 26 and derive similar advantages of the application services platform 26 as those obtained by the applications 40 that started on the servers 22 (e.g., fault tolerance, load balancing, data protection, etc.).

What is claimed is:

1. An application services platform, comprising:
a platform chassis;
a network interface supported by the platform chassis; and
a control circuit supported by the platform chassis and coupled to the network interface, wherein the control circuit comprises a memory storing a program and a processor configured to execute the program, wherein, when the processor executes the program, the control circuit is arranged to:
connect to a network through the network interface and discover a plurality of applications running on a set of servers, the set of servers not including the application services platform, wherein the discovery is automatically triggered upon powering up and connecting the application services platform to the network by monitoring an exchange of signals on the network;
query a user to identify which of the plurality of applications running on the set of servers on the network the user wishes to manage using the application services platform,
in response to querying the user, receive an application service command from the user, the application service command giving the control circuit permission to provide an application service to an application of the plurality of applications running on a server of the set of servers on the network, and
in response to receipt of the application service command, providing the application service to support operation of the application running on the server on the network, the application service being distinct from operating system services and security protection services provided by the set of servers;
wherein the application services platform further comprises an array of storage devices supported by the platform chassis coupled to the control circuit, the array of storage devices being arranged to provide storage capacity for use by the application running on the server;
wherein, when providing the application service to the application running on the server in response to receipt of the application service command, the control circuit is arranged to augment storage capacity of the application running on the server by providing additional storage capacity to the application running on the server by sharing storage of the array of storage devices of the application services platform with the application running on the server, the additional storage capacity being in addition to storage capacity on the server used by the application; and
wherein the server on the network is configured to provide user services to a user device on the network via the application running on the server on the network, the user device on the network being located external to the server on the network and external to the platform chassis of the application services platform.

2. An application services platform as in claim 1 wherein the control circuit is further arranged to:
detect, through the network interface and the network, that the application running on the server has failed, and
automatically provide a failure notification to the user through the network interface and the network, the failure notification indicating that the application running on the server has failed.

3. An application services platform as in claim 1 wherein the control circuit is further arranged to:
    automatically discover, through the network interface, a new application services platform which has recently connected to the network, and
    prompt the new application services platform for configuration information to assess abilities to cooperatively provide application services.

4. An application services platform as in claim 3 wherein the control circuit is further arranged to:
    after assessing the abilities to cooperatively provide application services, load balance delivery of the application services to the application.

5. An application services platform as in claim 3 wherein the control circuit is further arranged to:
    after assessing the abilities to cooperatively provide application services, minor application data of the application between the application services platform and the new application services platform.

6. A method, performed in an application services platform connected to a network, the method comprising:
    connecting to the network through a network interface and discovering a plurality of applications running on a set of servers, the set of servers not including the application services platform, wherein the discovery is automatically triggered upon powering up and connecting the application services platform to the network by monitoring an exchange of signals on the network;
    querying a user to identify which of the plurality of applications running on the set of servers on the network the user wishes to manage using the application services platform;
    in response to querying the user, receiving an application service command from the user, the application service command giving a control circuit permission to provide an application service to an application of the plurality of applications running on a server of the set of servers on the network; and
    in response to receipt of the application service command, providing the application service to support operation of the application running on the server on the network, the application service being distinct from operating system services and security protection services provided by the set of servers;
    wherein the application services platform includes an array of storage devices supported by the platform chassis coupled to the control circuit, the array of storage devices being arranged to provide storage capacity for use by the application running on the server; and
    wherein providing the application service includes augmenting storage capacity of the application by providing additional storage capacity to the application running on the server by sharing storage of the array of storage devices of the application services platform with the application running on the server, the additional storage capacity being in addition to storage capacity on the server used by the application.

7. A method as in claim 6 wherein the method further comprises:
    determining that the server is running out of space to run the application locally; and
    in response to determining that the server is running out of space to run the application locally, installing the application services platform on the network.

8. An apparatus comprising:
    a network interface for communicatively connecting to a network;
    an array of storage devices; and
    control circuitry having a memory storing a program and a processor configured to execute the program, wherein, when the processor executes the program, the control circuitry is configured to:
        connect to the network through the network interface and discover a plurality of applications running on a set of servers, the set of servers being separate from the apparatus, wherein the discovery is automatically triggered upon powering up and connecting the apparatus to the network by monitoring an exchange of signals on the network;
        query a user to identify which of the plurality of applications running on the set of servers on the network the user wishes to manage using the apparatus;
        in response to querying the user, receive an application service command from the user, the application service command giving the control circuitry permission to provide an application support service, over the network interface, to a selected application of the plurality of applications running on a server of the set of servers on the network; and
        in response to receipt of the application service command, providing, over the network interface, the application support service to support operation of the application running on the server on the network, the application support service being distinct from operating system services and security protection services provided by the set of servers;
    wherein, when providing the application support service, the control circuitry is arranged to augment storage capacity of the application running on the server by providing additional storage capacity to the application running on the server by sharing storage of the array of storage devices with the application running on the server, the additional storage capacity being in addition to storage capacity on the server used by the application.

* * * * *